Aug. 25, 1953  T. P. BRAZELL  2,649,814
REMOTE-CONTROL PEDAL OPERATING DEVICE
Filed June 16, 1950  2 Sheets-Sheet 1

Thomas P. Brazell
INVENTOR.

BY Clarence A. O'Brien
and Harvey B. Jackson
Attorneys

Aug. 25, 1953 T. P. BRAZELL 2,649,814
REMOTE-CONTROL PEDAL OPERATING DEVICE
Filed June 16, 1950 2 Sheets-Sheet 2
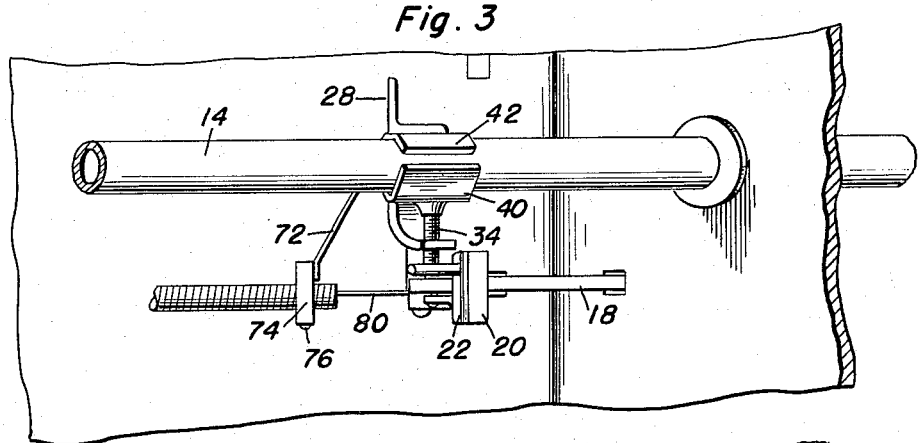
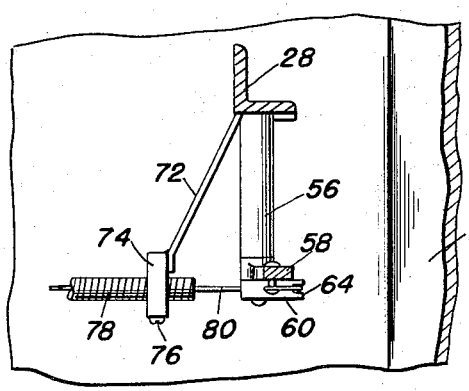
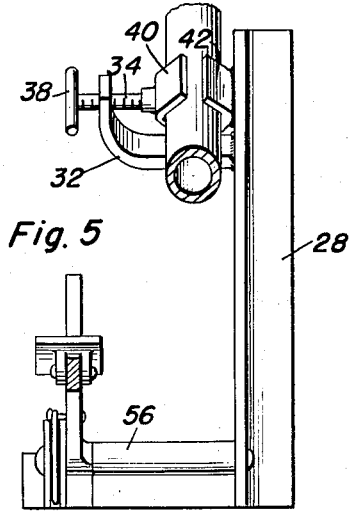
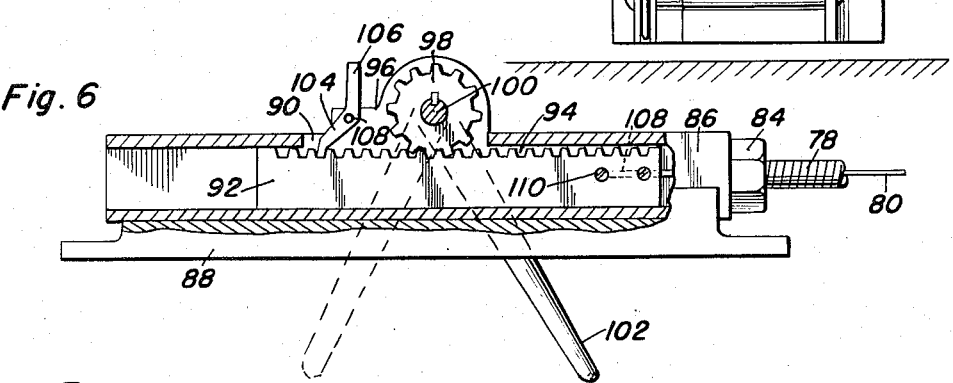
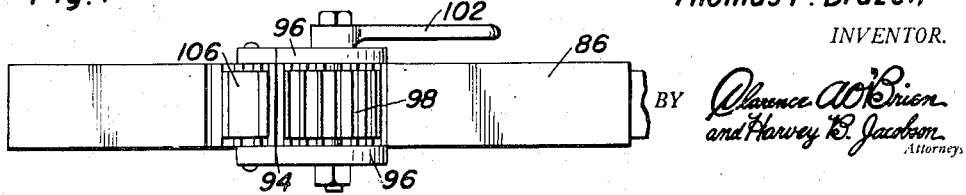
Thomas P. Brazell
INVENTOR.

Patented Aug. 25, 1953

2,649,814

UNITED STATES PATENT OFFICE 2,649,814

REMOTE-CONTROL PEDAL OPERATING DEVICE

Thomas P. Brazell, St. Louis, Mo.

Application June 16, 1950, Serial No. 168,403

3 Claims. (Cl. 74—481)

1

This invention comprises novel and useful improvements in a device for bleeding hydraulic brakes and more specifically pertains to an appliance specifically adapted for assisting a single person in bleeding air from hydraulic brakes and generally manipulating a brake or other pedal of a vehicle by remote control and to any extent desired at the convenience of the mechanic.

The primary object of this invention is to provide an appliance to enable a person in a remote position to actuate or depress a brake or other pedal of a motor vehicle and maintain the pedal in adjustably actuated position.

A further object of the invention is to provide an appliance as set forth in the foregoing object which is specifically adapted to and may be readily applied to or removed from an automotive vehicle and specifically may be mounted upon the steering column of the same.

Yet another object of the invention is to provide an appliance consisting of an operating and an operated member operatively connected with each other by a connecting means together with an improved manner for associating the operated member with a pedal of a motor vehicle.

These, together with various ancillary features and objects of the invention, which will later become apparent as the following description proceeds, are attained by the present invention, a preferred embodiment of which has been illustrated, by way of example only, in the accompanying drawings, wherein:

Figure 3 is a top plan view of the arrangement as shown in Figure 2;

Figure 4 is a horizontal sectional view taken substantially upon the plane indicated by the section line 4—4 of Figure 2 and illustrating certain structural details of the actuated member and its mounting upon the supporting means of the appliance;

2

Figure 8:
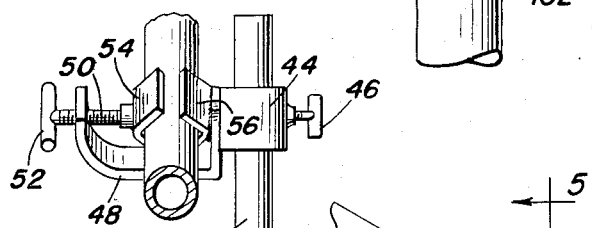
Figure 2:
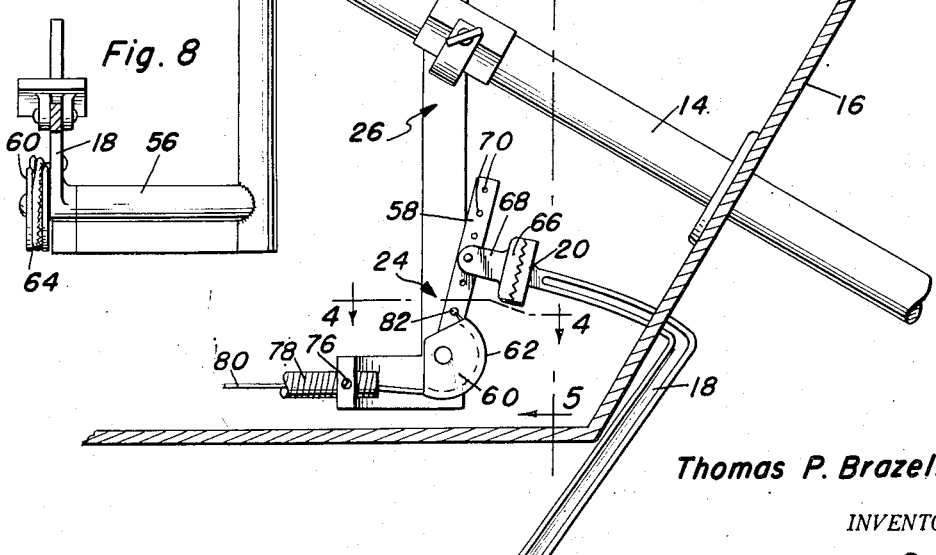
Figure 2 is an enlarged detail view taken in vertical section through the device as applied in Figure 1 and showing the manner in which the device is mounted upon the steering column of the vehicle and is operatively engaged with the brake pedal for operating the hydraulic brake mechanism of the vehicle.

Figure 5 is a vertical transverse sectional view taken substantially upon the plane indicated by the section line 5—5 of Figure 2 and showing the manner in which the device is releasably mounted upon the steering column of a motor vehicle;

Figure 6 is a detail view showing in vertical longitudinal section a portion of the operating construction of the operating member of the invention;

Figure 7 is a top plan view of the element shown in Figure 6; and,

Figure 8 is a front elevational view of a modified form of the device as installed upon the steering column of a motor vehicle.

Referring now more specifically to the accompanying drawings, wherein like numerals designate similar parts throughout the various views, it will be seen that the improved appliance forming the subject of this invention has been applied to an automotive vehicle indicated generally at 10, which includes the customary wheels 12 provided with hydraulic brake mechanism, not shown, but of a conventional and well understood design, the vehicle further having a steering column 14 which extends through a front floorboard 16, and the customary control pedals of the vehicle such as a hydraulic brake pedal 18 being likewise disclosed as extending through this floorboard and having a pedal portion 20 thereon. In motor vehicles, the pedals of the same which include the customary clutch pedal or brake pedal, are ordinarily spring urged and pivoted into a normal rest position, and are pressed downwardly against the floorboard causing a pivotal movement of the pedals when the same and the mechanism associated therewith are operated. It frequently becomes desirable and necessary that these pedals be repeated depressed throughout either all or a predetermined portion of their travel in order to enable a mechanic to properly service, repair or adjust the elements of the motor vehicle associated therewith. Heretofore it has been necessary to utilize the services of two persons, one person directly working upon the element to be serviced while the other manipulates the appropriate pedal. The present invention comprises an appliance of a simple, inexpensive, lightweight construction which may be readily applied to and clamped upon the steering column of a motor vehicle in proper position to actuate the desired pedal under the control of the mechanic himself at a remote position; and throughout any desired amount of the travel of the said pedal; and for locking the pedal in various adjusted positions of operation.

The appliance itself consists of an operating member indicated generally by the numeral 22 and which may be placed at any desired location, at the convenience of the mechanic. In addition, the appliance includes an operated member indicated generally by the numeral 24, a mounting member indicated generally by the numeral 26 and a connecting member indicated generally by the numeral 28 which is operatively associated with the operating and operated members.

Considering first the mounting or support member 26, it will be seen that the same includes a vertically disposed standard which may consist of either an angle iron member 28, as disclosed in Figures 1-5, or a rod or tubular shaft 30 as shown in the slightly modified form of Figure 8. In either event, the upper end of the standard 28 or 30 is provided with a clamp by means of which the standard is fixedly but releasably secured to a steering column 14 and mounted in depending relation therefrom. This clamp, in the arrangement shown in Figure 5, consists of a fixed supporting bracket 32 having an adjusting screw 34 provided with a handle 36 associated therewith, this adjusting screw at its extremity being swivelly connected to a V-shaped vise jaw 40. A complementary fixed V-shaped vise jaw 42 is welded or otherwise rigidly secured to the support 28 and cooperates with the movable jaw 40 for clampingly engaging the steering column 14 therebetween.

In the modified form of Figure 8, it will be seen that there is provided a collar 44 which is slidably received upon the rod-like standard 30, and is adjustably secured thereto as by a set screw 46, this collar having a laterally extending bracket 48 which carries the adjusting screw 50 which by means of a handle 52 serves to operate the V-shaped and swivelly mounted movable jaw 54 which cooperates with the V-shaped fixed jaw 56 welded or otherwise fixedly secured to the column 44. The operation of this clamp is identical with that described in connection with Figure 5.

At their lower ends, the supporting standards 28 and 30 have fixedly secured thereto a laterally disposed bracket 56 which may be identical for either form of support means, this bracket being preferably tubular and constituting a journal for a pivot axle, not shown, at one end of a lever 58 forming a part of the actuated member 24. At this outer extremity, the above mentioned axle of the lever 58 has a sector plate 60 fixedly secured thereto, this plate having an arcuate surface 62 which is peripherally grooved as at 64 in the manner of a pulley.

A foot member 66 having a mounting stem 68 is provided, this foot member being pivotally connected to the lever 58 and adjustable longitudinally of the same. Any suitable adjusting means can be provided, that illustrated consisting of a plurality of longitudinally spaced apertures 70 to which the stem 68 is adapted to be pivoted.

A further support bracket 72 is carried by the standard 28 or 30, and is provided with a collar 74 at its outer end, which by means of a set screw 76 is adapted to releasably but fixedly secure the end portion of a flexible housing 78. The housing 78 constitutes a part of the connecting means 28, this connecting means conveniently being in the form of a Bowden wire cable, or similar to a speedometer housing and cable. Slidably received in the flexible housing 78 is a flexible cable 80 which may constitute a piano wire or the like, the end of this wire extending from the housing 78 being entrained in the groove 64 of the sectorial plate 60 and being attached at its extremity as at 82 to one of the apertures 70 of the lever 58. It will now be apparent that as the cable 80 is moved longitudinally of the housing 78, the lever 58 will be pivoted thereby causing the foot member 66 to press against the pedal 20 and operate the lever 18.

Figure 1:
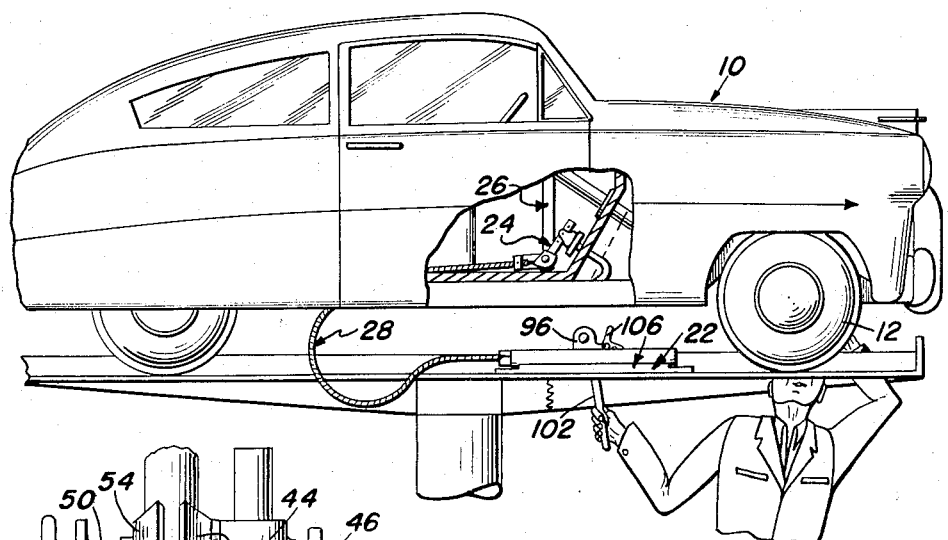
Figure 1 is a fragmentary side elevational view showing an automobile mounted upon an automobile lift for elevating the same whereby a mechanic may obtain access to the hydraulic brakes of the vehicle for adjusting the same, the appliance forming the subject matter of this invention being shown in proper position to enable the mechanic to depress the pedal from a position remote thereto.

At its other extremity, as shown in Figures 1 and 6, the flexible housing 78 is detachably secured as by a fastening nut 84 to the end portion of a cylinder 86 constituting a part of the operating means 22. This operating means consists of a suitable supporting base 88 of any desired character upon which the cylinder 86 is mounted, this cylinder having a slot 90 extending longitudinally of its upper surface. Slidably received in the cylinder 86, is a plunger or slide 92 having rack teeth 94 upon its upper surface, these teeth being adapted to be exposed through the slot 90.

A pair of side plates 96 extend upwardly from the cylinder 86 upon opposite sides of the slot 90, and an operating pinion 98 is journaled between these plates by means of an axle or shaft 100 and having an operating lever 102 fixedly secured thereto. The pinion is keyed or otherwise fixedly secured to the axle 100 as is the lever 102, and the pinion is continuously in mesh with the rack 94 of the slide or plunger 92. A ratchet or detent 104 is formed on one end of a lever having a handle 106 extending upwardly from between the side plates 96, this detent lever being pivoted between the side plates as at 108. The above mentioned flexible cable 80 has its end extending into the cylinder 86 and received within an axially disposed bore 108 formed in the end of the plunger 92, and is releasably secured therein as by set screws 110.

From the foregoing it will be apparent that the support means 26 may be suitably mounted upon and supported by the steering column 14 of a motor vehicle to properly position the foot member 66 against the pedal surface 20 of the pedal lever 18 to be operated by the device. When so positioned, by means of the flexible connecting means 28, the operating means 22 may be placed to suit the convenience of the user. When so connected, the operator can then manipulate the desired pedal 18 by rotating the pinion 98 through the agency of the hand lever 102, until the pedal 18 has been depressed to the desired extent, whereupon the ratchet or detent 104 will engage the rack 94 and maintain the slide 92 and consequently the actuated means and the pedal 18 in the desired adjusted position. It will be noted that these pedals are normally spring urged in a direction to cause the lever 58 to tension the cable 80, so that the detent 104 engaged in the rack 94 will securely lock and retain the pedal in the desired adjusted position.

Upon release of the detent by actuation of the finger grip portion 106 thereof, the spring urged pedal 18 will rotate the lever 58 in a counterclockwise direction thereby moving the slide 92 towards the right as viewed in Figure 6 to its idle position.

From the foregoing, it will be apparent that there has been provided an appliance which effectively enables a single person to operate or actuate from a remote position the various foot pedals of a motor vehicle in order to service the associated elements of the vehicle, and to lock or retain these pedals in the desired adjusted position.

From the foregoing, the construction and operation of the device together with its many advantages will be readily understood and further explanation is believed to be unnecessary. However, since numerous modifications and changes will readily occur to those skilled in the art after a consideration of the foregoing specification and accompanying drawings, it is not desired to limit the invention to the exact construction shown and described, but all suitable modifications and equivalents may be resorted to, falling within the scope of the appended claims.

Having thus disclosed and described the invention, what is claimed as new is as follows:

1. A remote control pedal operating device comprising a generally L-shaped bracket, the bracket being positionable with one leg vertical and the other leg horizontal, said horizontal leg having pivotally mounted thereon a lever arm, a pedal engageable foot pivotally mounted on said lever arm, a sectional plate secured to said lever arm and rotatably journaled on said horizontal leg, a flexible conduit extending from said mounting bracket and secured at its other end to a movable housing, a flexible cable entrained around said sectional plate and having one end secured to said lever arm, operating means carried by said housing secured to the other end of said flexible cable for moving same in order to pivot said lever arm and depress said pedal.

2. The operating device of claim 1 wherein said vertical leg has adjustably mounted thereon means for clamping the bracket to a steering column of a vehicle, said foot being adjustable with respect to said lever arm, whereby said pedal operating device may be adjusted to fit various types of vehicles.

3. The operating device of claim 1 wherein said operating means includes a rack secured to said other end of said flexible cable, a pinion carried by said housing in engagement with said rack, said pinion moving said rack longitudinally of said housing upon rotation of said pinion, a locking pawl carried by said housing engaging said rack for preventing movement thereof in one direction and retaining said pedal in a depressed position.

THOMAS P. BRAZELL.

References Cited in the file of this patent

UNITED STATES PATENTS

| Number | Name | Date |
|---|---|---|
| 1,171,642 | Ransom | Feb. 15, 1916 |
| 1,608,992 | Peavy | Nov. 30, 1926 |
| 1,801,987 | Strand | Apr. 21, 1931 |
| 2,302,158 | Van Vulpen | Nov. 17, 1942 |
| 2,384,742 | Hewitt | Sept. 11, 1945 |
| 2,465,183 | Allen | Mar. 22, 1949 |
| 2,501,249 | Wilsdorf | Mar. 21, 1950 |